Oct. 4, 1932.  C. W. DAKE  1,880,846
PACKING FOR STEAM TURBINES AND THE LIKE
Filed Aug. 16, 1930  2 Sheets-Sheet 2

INVENTOR.
Charles W. Dake
BY
ATTORNEYS.

Patented Oct. 4, 1932

1,880,846

UNITED STATES PATENT OFFICE

CHARLES W. DAKE, OF CHICAGO, ILLINOIS, ASSIGNOR TO THE PYLE-NATIONAL COMPANY, OF CHICAGO, ILLINOIS, A CORPORATION OF NEW JERSEY

PACKING FOR STEAM TURBINES AND THE LIKE

Application filed August 16, 1930. Serial No. 475,668.

My invention relates to improvements in packing for steam turbines and the like and has for one object to provide a new and improved form of packing which will offer a minimum of resistance to a rotating shaft, which will be steam or air tight, long lived and easy to assemble and will offer little or no difficulty in connection with assembly and disassembly. Other objects of my invention will appear from time to time throughout the specification and claim.

My invention is illustrated more or less diagrammatically in the accompanying drawings, wherein—

Like parts are indicated by like characters throughout the specification and drawings.

Figure 1:
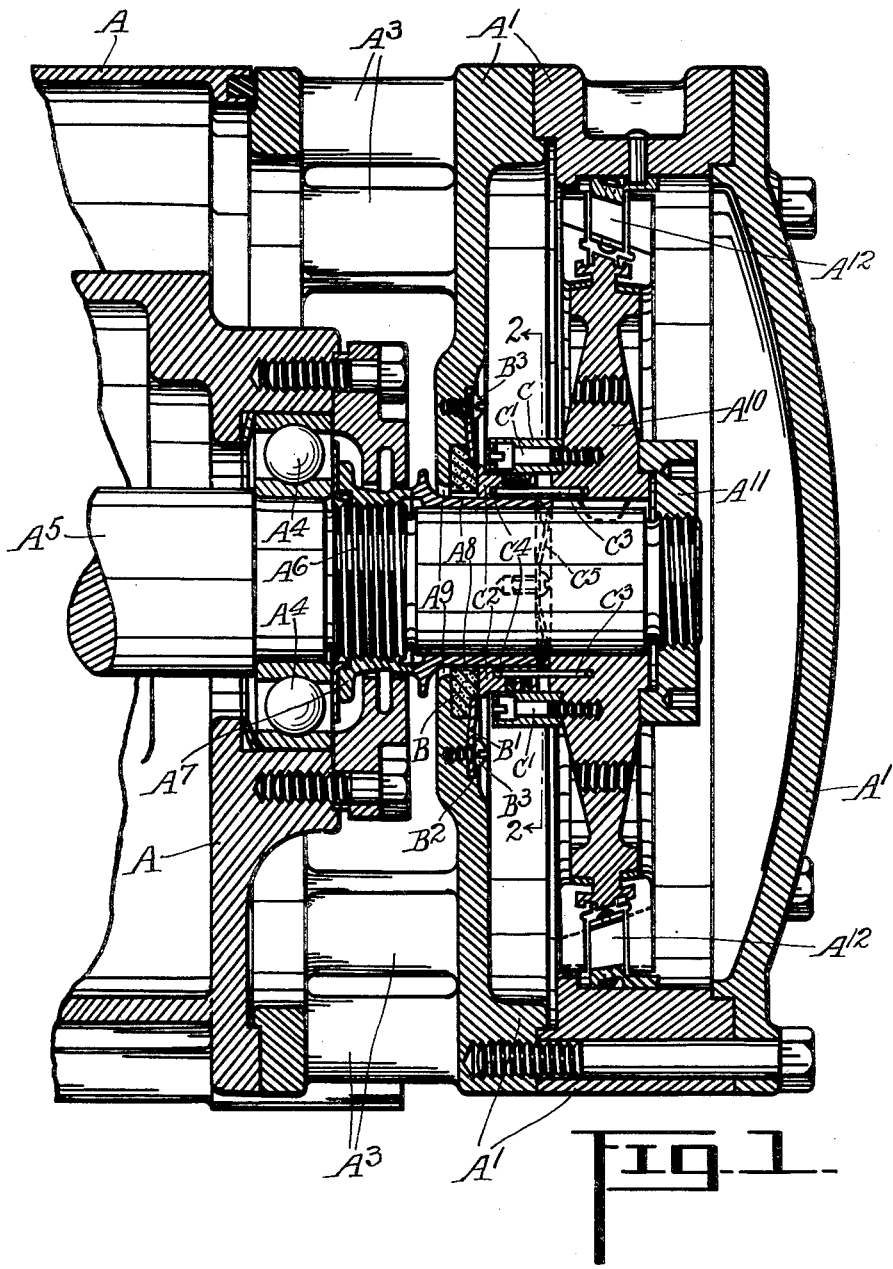
Figure 1 is a longitudinal section through a steam turbine illustrating my invention.
Figure 2:
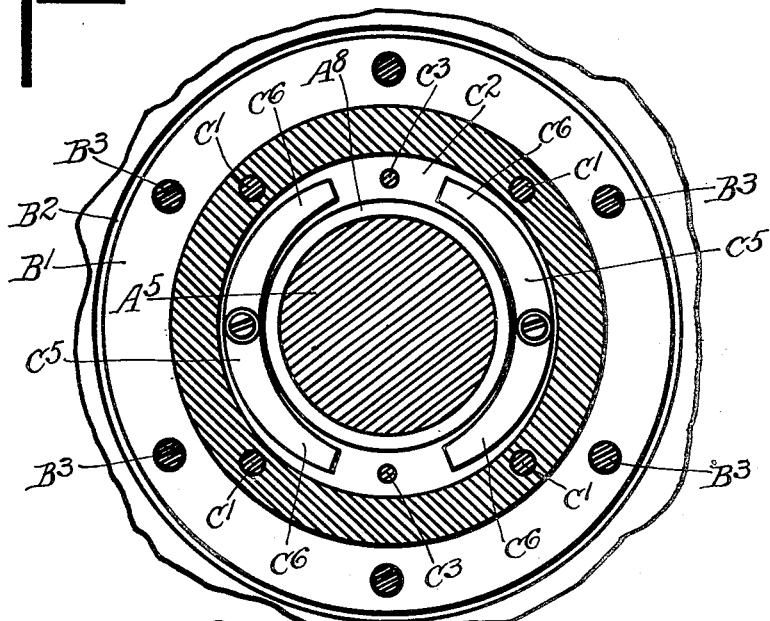
Figure 2 is a section along the line 2—2 of Figure 1.
Figure 3:
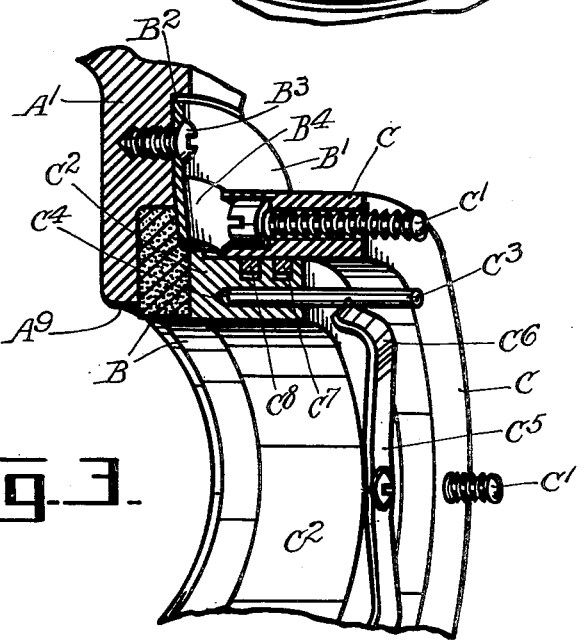
Figure 3 is a detail on an enlarged scale through the packing collar.

I have illustrated my invention in connection with the rotating shaft for a steam turbine as primarily adapted to be applied with a turbo generator. It will be obvious that while my invention is primarily so intended it might be used for other purposes and it might even be used under some circumstances with a reciprocating rather than a rotating shaft.

A is a generator housing. $A^1$ is a turbine housing. The two are tied together by filler blocks $A^3$. $A^4$ is a bearing in the generator housing which supports the turbine shaft $A^5$. The stub end of the shaft projects inwardly into the turbine housing. The shaft is threaded as at $A^6$ adjacent the bearing. A nut $A^7$ engages the threaded portion and a filler sleeve $A^8$ is mounted on the shaft engaging the nut. This filler sleeve projects inwardly into the turbine housing through the aperture $A^9$. The shaft carries the turbine wheel $A^{10}$, the nut $A^{11}$ on the end of the shaft engaging the wheel forcing it inwardly along the shaft against the filler sleeve $A^8$. The guide passages $A^{12}$ associated with the steam nozzle not shown, control and guide the steam as it travels in the housing impinging upon the turbine buckets to drive the turbine. The details of the turbine form no part of my present invention and need no further discussion.

Surrounding the aperture $A^9$ in the wall of the turbine housing is a carbon ring B. This ring is socketed in the interior face of the wall as indicated and is yieldingly held in place by the flexible tight ring $B^1$. This flexible tight ring is socketed in the socket $B^2$ on the inner wall of the housing, is held in place by the screws $B^3$ and on its inner periphery overlies and yieldingly engages the outer periphery of the carbon ring, leaving a relatively wide flat annular bearing face $B^4$ on the carbon ring. The carbon ring is relatively rigid and relatively friable but it successfully resists wear. It is necessary that it be flexibly mounted so that expansion and contraction of the ring and of the housing will not cause breaking or chipping of the ring. The ring is stiff enough and heavy enough in cross section so that the engagement of the relatively thin flexible holding ring is sufficient to seat it in its socket and make a steam tight joint between the body of the carbon ring and the wall of the housing.

Removably mounted on the face of the turbine rotor is an open ended cylinder C. It is held in place by a plurality of screws $C^1$ which penetrate the body of the turbine rotor. This cylinder is substantially of the same interior diameter as the outer diameter of the working face of the carbon ring and is of such length that when the turbine is assembled it clears the flexible tight or holding ring $B^1$. $C^2$ is a floating ring. It is contained inside the cylinder C. It encircles the shaft and sleeve $A^8$ and it may be in sliding contact with the outer periphery of the sleeve $A^8$. Pins $C^3$ projecting from the turbine wheel penetrate apertures $C^4$ in the floating ring and guide it along lines parallel with the axis of the shaft. Two arcuate spring fingers $C^5$ on the back end of the ring $C^2$ are upwardly recurved to each having at each end a bearing surface $C^6$ which engages the face of the turbine wheel, the pins $C^3$ holding the floating ring also against rotation with respect to the turbine wheel. Spring packing rings $C^7$ $C^8$ are located in the floating ring C² and make a tight joint with the inner periphery of the cylinder C. The flexible engagement of the surface C⁶ on the fingers C⁵ with the wheel causes the floating ring to be pressed against the carbon ring making at that point a steam tight joint, the floating ring rotating with the turbine wheel, the carbon ring being held against rotation. Since the floating ring only contacts the housing through its contact with the carbon ring, the floating ring is free to move with the very limited movement of the turbine shaft which may take place. Longitudinal movement is taken care of in that the floating ring may slide in the cylinder so that the springs may urge it outwardly toward the carbon ring and may compensate for wear without in any way affecting or minimizing the steam tightness. As the turbine rotates the floating ring and the cylinder rotate with the wheel. The floating ring is pressed against the carbon ring making a tight joint. The spring packing rings make a tight joint and still permit longitudinal movement of the floating ring. There is a sufficient clearance between the floating ring and the filler sleeve on the shaft so that there will be no tendency toward binding. Steam does not enter that clearance because it cannot escape from the housing beyond the spring packing rings to any appreciable extent.

I have used the term carbon as applied to the ring B, because that is the name given this ring in the art and because rings of this kind are ordinarily in part at least of carbon and have a carbon appearance. It may be made of pure carbon or some alloy of carbon and crystalline material or an alloy of carbon and fibrous material or it may be bakelite or bakelite with carbon as the case may be. The point is that it is primarily a non-metallic ring that stands heat, moisture and friction and which wears smooth to make a steam tight joint and I want it understood therefore that the term carbon is used in the general sense as applied to any ring of this general character.

I claim:

A packing for shafts and the like comprising an apertured housing through which the shaft extends, a carbon packing ring socketed in the housing concentric with the aperture, flexible means for holding the ring seated in its socket comprising a flexible holding ring socketed in the housing, screws adjacent the outer periphery of the holding ring adapted to seat it, the inner periphery of the flexible ring engaging the carbon ring adjacent its outer periphery, the carbon ring having an annular bearing surface adjacent its inner periphery, a rotor associated with the shaft, a floating ring adapted to travel with the rotor to engage the annular seat on the carbon ring, a cylinder enclosing the floating ring, spring packing rings interposed between the floating ring and the cylinder, means for preventing relative rotation of the cylinder and the floating ring and a plurality of arcuate fingers each centrally anchored and having each two contact members adjacent each end whereby yielding pressure is permitted from the rotor to the floating ring adjacent each end of each finger tending to seat the floating ring on the carbon ring.

Signed at Chicago, county of Cook and State of Illinois, this 13th day of August, 1930.

CHARLES W. DAKE.